(12) United States Patent
Doyle et al.

(10) Patent No.: US 8,048,641 B2
(45) Date of Patent: Nov. 1, 2011

(54) MICROPATTERNING OF BIOLOGICAL MOLECULES USING LASER ABLATION

(75) Inventors: Andrew D. Doyle, Bethesda, MD (US); Kenneth M. Yamada, Bethesda, MD (US); Francis W. Wang, Gaithersburg, MD (US)

(73) Assignee: The United States of America as represented by the Secretary, Department of Health and Human Services, Washington, DC (US)

( * ) Notice: Subject to any disclaimer, the term of this patent is extended or adjusted under 35 U.S.C. 154(b) by 586 days.

(21) Appl. No.: 12/249,824

(22) Filed: Oct. 10, 2008

(65) Prior Publication Data

US 2009/0096133 A1 Apr. 16, 2009

Related U.S. Application Data

(60) Provisional application No. 60/979,045, filed on Oct. 10, 2007.

(51) Int. Cl.
*G01N 31/00* (2006.01)
*G01N 33/53* (2006.01)
(52) U.S. Cl. ............ 435/7.21; 435/7.1; 436/1; 436/501; 436/518; 424/9.1; 424/520; 422/1; 422/50; 530/300; 530/350
(58) Field of Classification Search .................. None
See application file for complete search history.

(56) References Cited

U.S. PATENT DOCUMENTS

| 4,951,097 | A | * | 8/1990 | Oguchi et al. ................. 382/128 |
| 6,042,738 | A | * | 3/2000 | Casey et al. ........................ 430/5 |
| 7,101,587 | B2 | * | 9/2006 | Gingras et al. ................ 427/177 |

* cited by examiner

*Primary Examiner* — Lisa Cook
(74) *Attorney, Agent, or Firm* — Woodcock Washburn LLP

(57) ABSTRACT

The present invention employs the natural hydrophilic properties of a macromolecular film such as a hydrogel and in combination with localized photo-ablation of monolayers created with the hydrogel using multi-photon laser excitation, provides a stampless, versatile method of micropattern fabrication.

10 Claims, 7 Drawing Sheets

MICROPATTERNING OF BIOLOGICAL MOLECULES USING LASER ABLATION

CROSS-REFERENCES TO RELATED APPLICATIONS

This application claims benefit of U.S. provisional application 60/979,045, filed Oct. 10, 2007, which application is herein incorporated by reference.

BACKGROUND OF THE INVENTION

In the last decade, several laboratories have investigated extracellular matrix (ECM) protein interactions using self-assembled monolayer (SAM) micro-patterning techniques based on soft lithography, where silicone "stamps" containing micron-sized patterns are generated to "ink" ECM proteins onto two dimensional surfaces, controlling the spatial distribution of cell-ECM attachments, while blocking non-adhesive regions with hydrophilic alkyl thiol groups. However, these techniques utilize thiolated gold coverslips to conjugate ECM proteins. Gold, being an electron dense metal, can dramatically quench fluorescent proteins, thereby reducing the ability to observe labeled proteins using living cells without causing phototoxicity. The current invention is based, in part, on the discovery of improved techniques for micropattern fabrication that do not rely on "stamps".

BRIEF SUMMARY OF THE INVENTION

The present invention employs natural hydrophilic properties of a macromolecular film, such as a hydrogel, and combined with localized photo-ablation of monolayers or multilayers created in the film using multi-photon laser excitation, provides a stampless, versatile method of micropattern fabrication. Thus, in one aspect, the invention provides a method of creating a micropattern of a biological molecule, the method comprising: preparing a hydrophilic macromolecular film attached to an activated substrate, wherein the substrate is of a material to which the biological molecule can adhere; etching a pattern onto the macromolecular film using a laser; and depositing the biological molecule onto the pattern, wherein the biological molecule adheres to the substrate and not to the hydrophilic macromolecular film. In some embodiments, the hydrophilic macromolecular film is a hydrogel such as polyvinyl alcohol or polyacrylamide. In further embodiments, the hydrophilic macromolecular film is a silicone polymer or co-polymer.

In some embodiments, the film is a thin film, e.g., about 200 nm or less in thickness, often about 100 nm or less in thickness.

The substrate may be any suitable substrate to which the film may be linked, typically by covalent linkage. For example, the substrate may be glass. In certain embodiments, e.g., where the substrate is glass, the substrate may be activated for linkage using a silane.

The laser may be any suitable laser for creating the pattern on the film. In some embodiments, the laser is a pulsed laser. Such a laser is often controlled by a shutter and a light guiding system.

A biological molecule that is deposited in the pattern created by the laser may be any biological molecule. In some embodiments, the biological molecule is a protein. In some embodiments, the biological molecule is a glycoprotein. In some embodiments, the biological molecule is a nucleic acid.

In another aspect, the invention provides a method of spatially controlling the interaction of a biological molecule with another molecule of interest, the method comprising incubating a micropattern of the biological molecule that is obtained using the methods of the invention with the molecule of interest. In some embodiments, the micropattern may be incubated with a cell.

DETAILED DESCRIPTION OF THE INVENTION

Introduction

Figure 1:
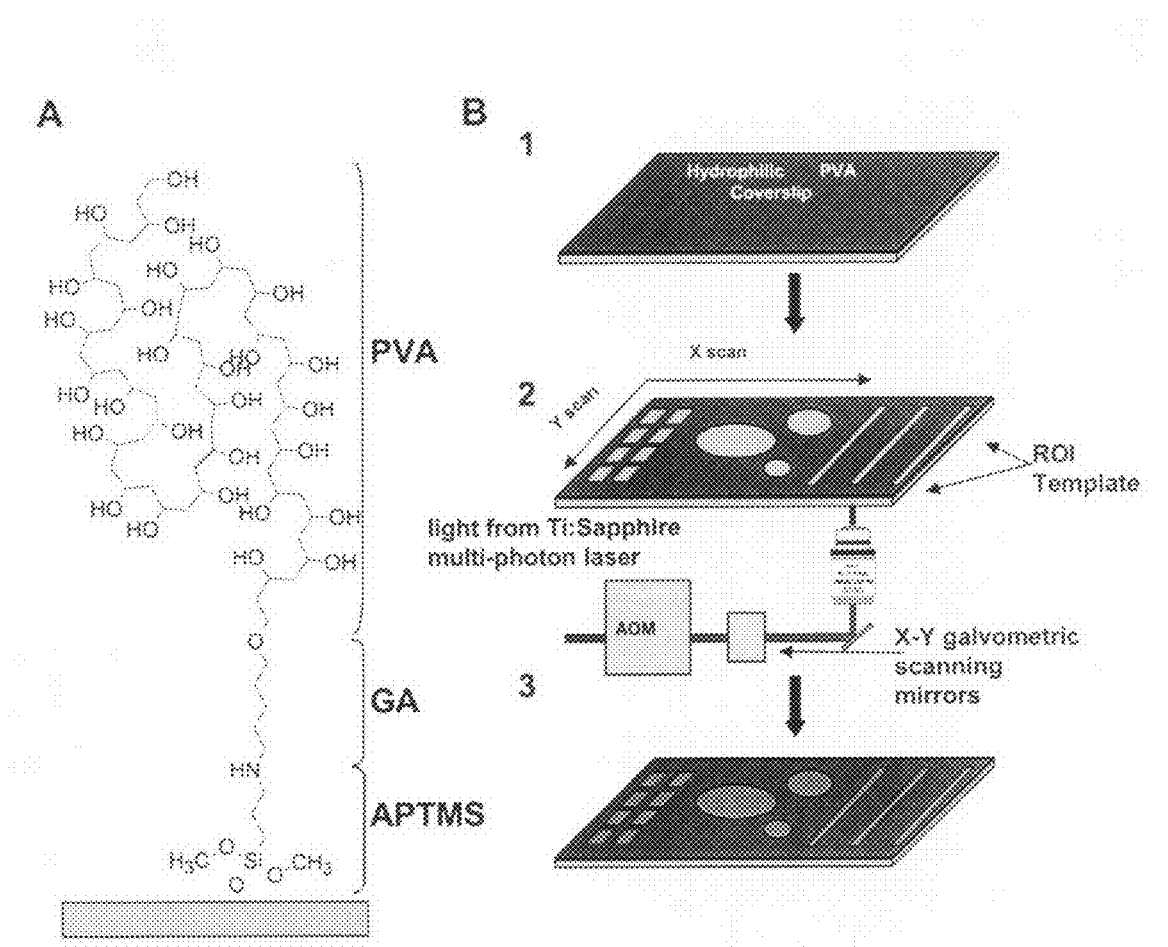
FIG. 1. Generation of micropatterned PVA films by micro photopatterning. A) Schematic of a single polyvinyl alcohol (PVA) molecule conjugated directly to a glass coverslip through 3-(amino)propyl-trimethyloxysilane (APTMS) and glutaraldehyde (GA). B) Hydrophilic PVA-coated glass-bottom dishes (1) photo-ablated using a Zeiss LSM 510 NLO system. (2), Region of interest (ROI) template generated by the software dictates the ablation pattern through an acoustic optical modulator (AOM) and X and Y galvometric mirrors that shutter and guide the multiphoton laser beam along the PVA coverslip. (3) After photoablation, quenching with $NaBH_4$ and rinsing, protein added to the dish adsorbs only to ablated regions.
Figures 1, 2:
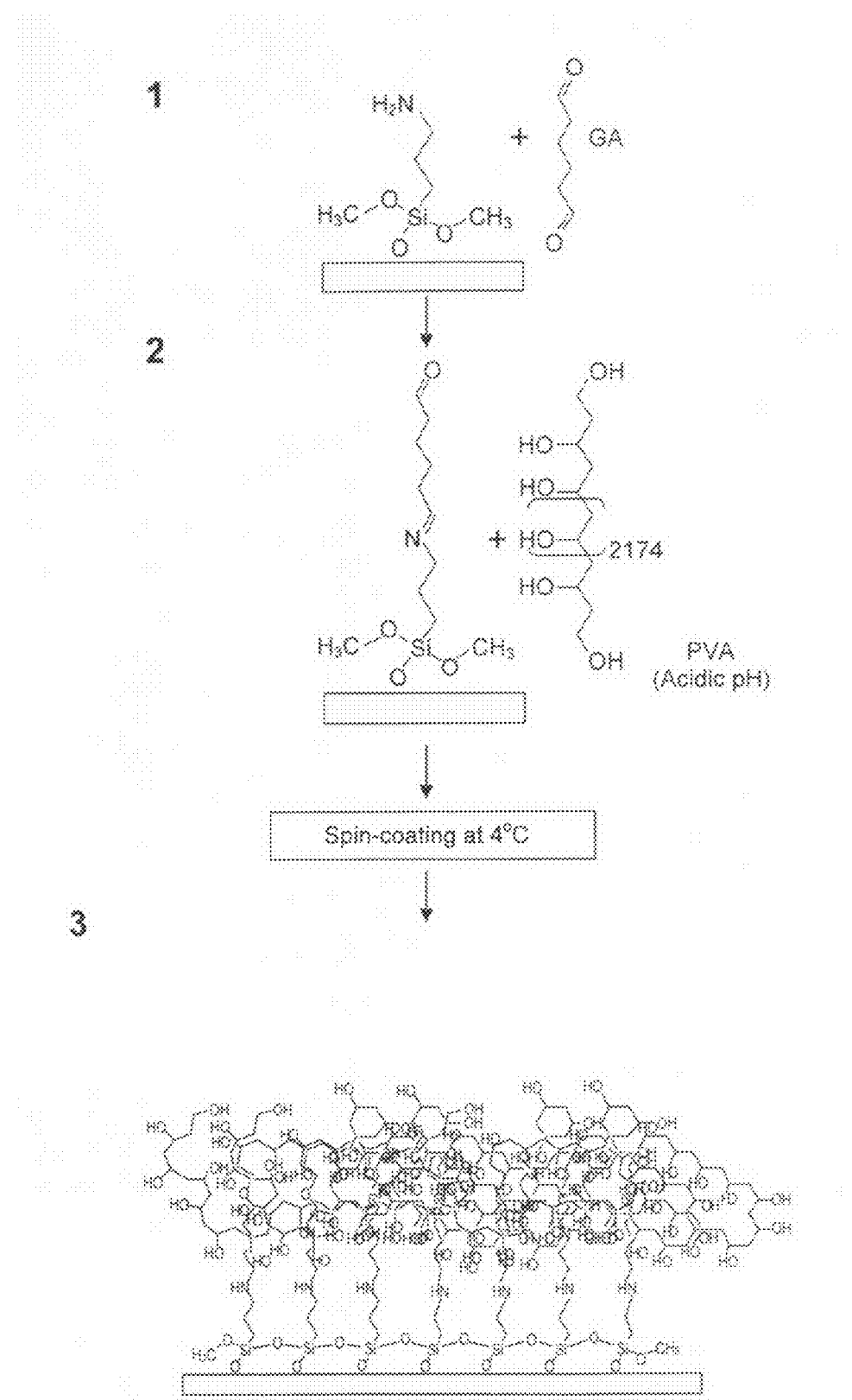
FIG. 2 A) Process of micro photopatterning. 1) Acid-washed glass-bottom dishes or coverslips are silanized with 0.5% APTMS, heat cured, then activated with 0.5% glutaraldehyde. 2) Activated surfaces are then treated with an acidified 5% poly(vinyl) alcohol solution and spin-coated at 4° C., which forms a macromolecular thin film (3). 4) Prior to micro photopatterning (μPP), dishes are leveled throughout the field of view using stage set screws. Stage positions are marked to indicate ablation sites around which larger patterned arrays are centered using the tile function in the multitime automation macro. 5) PVA thin films are then ablated using ~90% 755 nm excitation in the designated pattern. 6) 1M $NaHB_4$ in 1N NaOH was added to patterned dishes containing 200 mM ethanolamine in $NaHPO_3$ buffer (pH 8.0) at a 1:100 ratio for 8 minutes to quench glutaraldehyde autofluorescence. After treatment with $NaBH_4$, fluorescently labeled ECM proteins are added to the surface.
Figure 2:
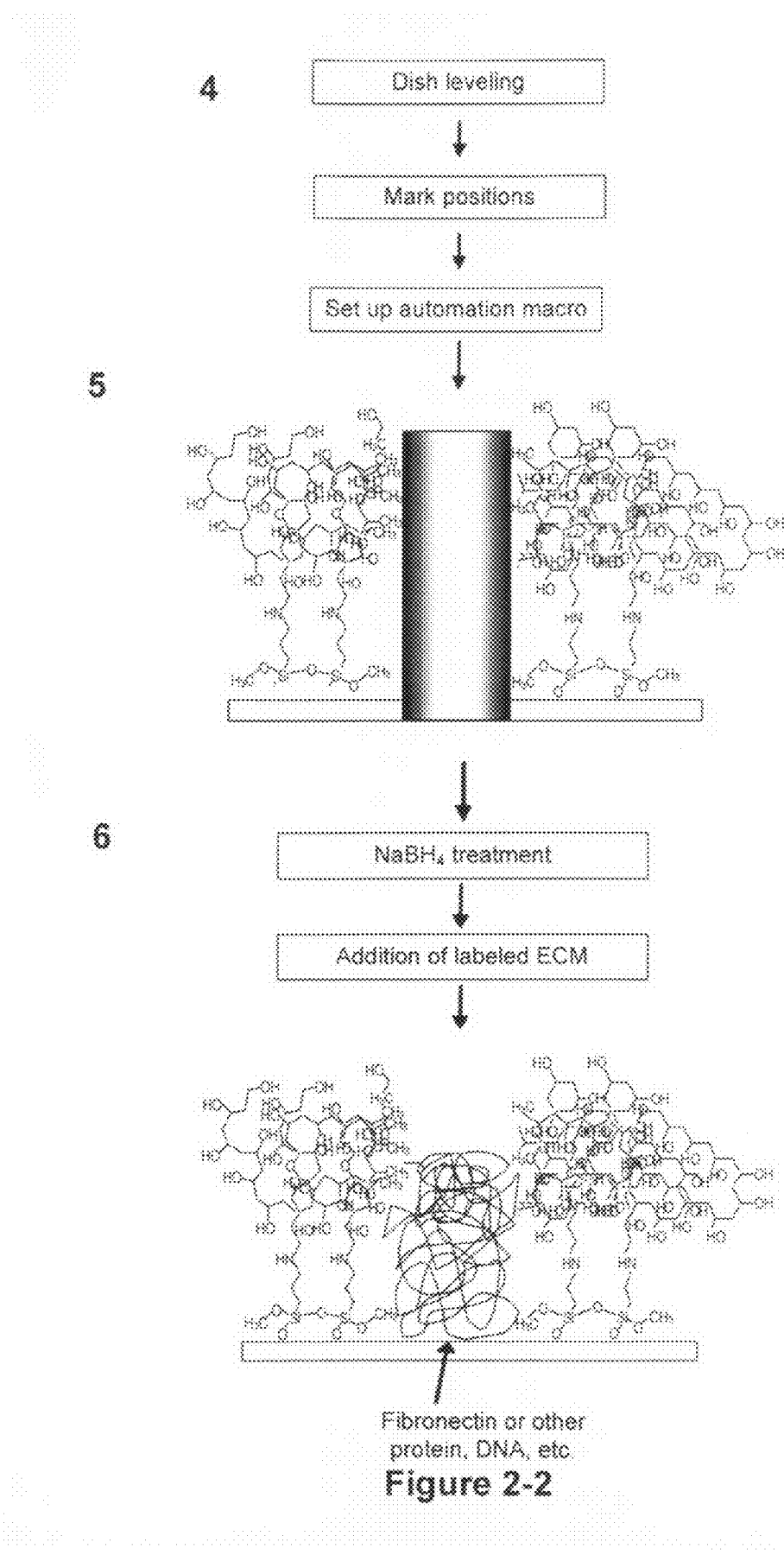

Various techniques have used micro-contact patterning (μCP) to investigate ECM protein interactions. For example, several laboratories have developed self-assembled monolayer (SAM) micro-patterning techniques based on soft lithography, where micron to nanometer silicone "stamps" are generated to "ink" ECM proteins onto two dimensional surfaces, controlling the spatial distribution of cell-ECM attachments, while blocking non-adhesive regions with hydrophilic alkyl thiol groups. However, as noted above, these techniques can present problems, e.g., reducing the ability to observed fluorescent-labeled protein interactions with live cells.

The present invention relates to improved methods to generate submicron sized spots using a photo ablation system, e.g., a tunable multiphoton laser coupled to a confocal microscope, to photo ablate a macromolecular film, e.g., a hydrogel such as polyvinyl alcohol (PVA). Through controlled photo ablation, the macromolecule film, e.g., hydrogel layer, is locally removed allowing deposition of proteins or other biological materials into distinct patterns. Using a software-controlled region of interest (ROI) function it is possible to precisely control patterns and generate many patterns, e.g., up to several hundred, within a very short time frame, such as 15 seconds. In typical embodiments, the precise control of the photoablation process is through the combination of an acousto-optic modulator (AOM) and the X-Y galvometric scanning mirrors that shutter and direct the laser light, respectively. The use of ROI's produces a "virtual mask" that can be created in any shape or pattern and are easily modified.

Furthermore, due to the high refractive index of the macromolecular films, e.g., hydrogels used in the invention, confocal and total internal reflection fluorescence (TIRF) microscopy are possible. Thus, unlike μCP techniques, micro-patterning (μPP) allows live cell imaging of multiple fluorophores and is possible even with TIRF microscopy. In addition, μPP allows kinetic quantification of interactions such as ECM-cell interactions. This invention therefore provides the versatility to create spots of any size or shape easily on the same substrate, e.g., a coverslip, to which one or more biological molecules can be deposited. Furthermore, this process can be repeated multiple times to directly conjugate multiple biological molecules, such as different proteins, to the same local region.

Thus, the present invention provides a stampless technique (i.e., can be considered a direct-write system) that does not rely on a physical stamp generated from a hard master formed via nanolithography techniques. With the μPP method, all patterns are stored as a template in a computer software program that can be used at any time. In addition, the same template can be used with different high numerical aperture objectives to change the pattern's actual size. This can also be accomplished by the digital zoom function associated with the confocal microscope scan head. As an example, the zoom may be set to 2×. Under these conditions only half of the area the galvometric scanning mirrors is used to scan the sample, but keeping the same pixel scanning (e.g., the same number of scans but in a smaller area). Hence, each pattern is scanned 2× smaller. This can be applied for greater than 2×, e.g., up to 8× (with a 100× objective), without a significant change in the pattern's appearance.

The process of μPP can also be performed in series, thereby allowing the adsorption of multiple different proteins (or other macromolecules such as DNA) within microns of each other. To date with μCP only large stamped (tens to hundreds of μm$^2$) areas could accomplish this.

In addition, macromolecular film patterns, e.g., hydrogel thin film patterns, are viable for a long period of time, for example, one month or longer, whereas stamp-based micro-patterning techniques are defined for only a matter of days.

Definitions

A "macromolecular film" as used herein refers to a hydrophilic, medium and high molecular weight oligomers or polymers that contain functional groups capable of further polymerization. Medium and high molecular weight typically means average molecular weights greater than 700 Daltons. A macromolecular film of this invention is typically a thin film-like coating of a surface of a high-molecular-weight polymer, which is directly conjugated to the underlying surface.

A "hydrogel" as used in this invention refers to a polymeric material which can absorb at least 10 percent by weight of water when it is fully hydrated, and typically is over 90% water. Generally, a hydrogel material is obtained by polymerization or copolymerization of at least one hydrophilic monomer in the presence of or in the absence of additional monomers and/or macromers. A "hydrogel" as used herein can also refer to a material that is capable of being polymerized, but is not in a cross-linked state. The hydrogel used for this procedure does not permit adsorption of proteins, or other biological molecules, or adhesion of cells.

A "substrate" in the context of this invention typically refers to an inorganic or organic material to which the macromolecular film is linked, preferably by covalent linkage.

"Micropatterning" and "microphotopatterning (μPP)" are used interchangeably herein to refer to localized photo-ablation of a macromolecular film attached to a substrate, such as a hydrogel monolayer, in a desired pattern on which a biological molecule is deposited where the biological molecule adheres to the substrate and not to the hydrophilic film.

A "biological molecule" or "biomolecule" as used in the context of this invention refers to a molecule that is substantially of biological origin. Such molecules may include non-naturally occurring components that mimic a naturally occurring component, e.g., a non-naturally occurring amino acid.

The terms "polypeptide," "peptide" and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers, those containing modified residues, and non-naturally occurring amino acid polymer.

As used herein, the terms "nucleic acid," "polynucleotide" and "oligonucleotide" are not limited by length and are generic to linear polymers of polydeoxyribonucleotides (containing 2-deoxy-D-ribose), polyribonucleotides (containing D-ribose), and any other N-glycoside of a purine or pyrimidine base, or modified purine or pyrimidine bases. These terms include double- and single-stranded DNA, as well as double- and single-stranded RNA. Such nucleic acid polymers may also comprise non-naturally bases as well as naturally occurring bases. A nucleic acid, polynucleotide or oligonucleotide can comprise phosphodiester linkages or other linkages known in the art.

As used herein and in the appended claims, the singular forms "a," "and," and "the" include plural referents unless the context clearly dictates otherwise. Thus, for example, reference to "a molecule" includes a plurality of such molecules.

Macromolecular Films

Any number of polymers can be used in generating the macromolecular film. Polymers containing side-chain activatable groups such as SH, $NH_2$, COOH, and OH are sensitive to photolytic degradation and are desirable for use in the invention. Often, hydrogels are employed, but silicon polymers and co-polymers such as polydimethyl siloxylane may also be used.

The thickness of the layer may be in the range of about 10 nm to a few μms. For example, in some embodiments, the films are generated as thin films, e.g., from 10 nm to about 1 μm. Often a thin film is about 100 nm.

Thicker macromolecular films, preferably thicker hydrogel films that contain an elastic component, can also be used in this invention, for example, when it is desirable to generate elastic patterns in 2D, and/or within a 3D gel that would mimic the rheological properties of living tissues.

Exemplary hydrogels include, but are not limited to, PVA, modified polyvinylalcohol (e.g., as nelfilcon A), poly(hydroxyethyl methacrylate), poly(vinyl pyrrolidone), PVAs with polycarboxylic acids (e.g., carbopol), polyethylene glycol, polyacrylamide, polymethacrylamide, sugar-substituted polyacrylate, silicone-containing hydrogels, polyurethane, polyurea, polysaccharides (e,g, alginic acid, hyaluronic acid, dextran and its derivatives) and the like. In some embodiments, a polymerase having a high refractive index, e.g., greater than 1.5, may be used.

In some embodiments, a dye may be added to the polymers in order to reduce the required energy for the ablation to occur. Such a dye is typically selected based on the excitation light (e.g., the laser wavelength) used. Thus, for example, for a 755 nm multi-photon wavelength, coumarin could be used, since it is excited by this wavelength and UV wavelengths.

In some embodiments, conjugation of light-activated molecules directly to a hydrogel surface such as a PVA surface would make is possible to photo-activate (as opposed to photoablate) the surface to which proteins could be attached. Thus, in some embodiments, the photo-treatment may not ablate, or only partially ablate, the macromolecular film.

As understood in the art, a non-fouling hydrogel is desirable for use in the invention, such that biological molecules or cells do not attach to it in view of its hydrophilic nature.

Conjugation of the Macromolecular Film to the Substrate

The substrate to which the polymer is attached can be any rigid support to which the macromolecular film can be linked. For example, the support can be glass, or other silicon substrates (such as fused silica, polysilicon, or single silicon crystals); or metal. In some embodiments, the substrate is quartz glass, mesoporous silica, nanoporous alumina, ceramic plates, glass, graphite or mica; or materials for medical implants, such as titanium-based materials.

In some embodiments the substrate is glass. Techniques for conjugating the macromolecular film to glass, or other, substrate are well known. For example, amino-terminated silanes are commonly used to activate glass to allow for attaching molecules. Optionally, a cross-linker such as glutaraldehyde is also employed e.g., when amino terminal silanes are used. In the current invention, the macromolecular film is typically covalently linked to the substrate.

It may also be desirable in some embodiments to employ a plastic such as polystyrene; polypropylene; polytetrafluoroethylene, polyacrylates, polycarbonate and the like.

In some embodiments, an alkoxy aldehyde silane can be used to introduce aldehyde groups on the glass coverslips (e.g., Coyne et al., U.S. Pat. No. 6,589,799).

In some embodiments, instead of German glass coverslips, thin films of poly(methyl methacrylate) [PMMA] or polystyrene can be used as the substrates. For example, surface amination of PMMA entails: A) preparation of a N-lithiodiaminoethane solution from a reaction of 6 mmol dry ethylenediamine (Aldrich, Milwaukee, Wis.) with 1 mmol n-butyllithium (2.0 M in cyclohexane, Aldrich); B) incubation of PMMA films with the lithiated diamine solution for 2-5 min before flushing and drying the films under a stream of nitrogen (Llopis et al.). Surface amination of polystyrene thin films (or microwells) entails: A) carboxylation by permanganate oxidation in diluted sulfuric acid; B) activation with water-soluble carbodiimide and grafting with 1,3-diaminopropane to introduce free primary amino groups on the thin films (or microwells) [Zammnatteo et al., *Anal Biochem.* 1996 Apr. 5; 236(1):85-94].

Micro-Pattern Formation

A micro-pattern of the invention is created using a laser to create the pattern. For example, in some embodiments a tunable two-photon laser source is used. Such lasers can have a variety of ranges, e.g., 700-920 μm. Other lasers such as high-energy UV excimer lasers (200 nm range) or pulsed diode YAG lasers (including frequency doubled pulses) may also be used. Thus, a laser wavelength used for ablation may be between 100 nm to 1200 nm, e.g., from 150 nm to 1100 nm if the light intensity is substantial enough to provide 500-2000 μφoules/cm².

In some embodiments, e.g., where the macromolecular film is PVA, which degrades over time when exposed to any light source, other wavelengths in the visible range may be used, if the total amount of light energy focused at the sample is high enough.

The light is directed as desired to make the pattern. In some embodiments, direction of the light is associated with 1) an acousto optic modulator (AOM) to shutter and control the laser intensity and 2) a set of X and Y galvometric mirrors which make up the point scanner of the confocal microscope. Other types of raster scanners can also be used.

In some embodiments, the light may be directed using digital light projector (DLP) chips (Texas Instruments). The DLP chip consists of thousands of small mirrors tens of microns in size that can be adjusted to direct toward or away from a sample. In this way multiple points can be scanned simultaneously, effectively reducing the time required to generate patterns.

Following pattern generation, a biological molecule may be adsorbed on the substrate surface in the region where the macromolecular film was ablated. The biological molecule does not adsorb to the remaining macromolecular film in view of the hydrophilic nature of the film. Such a biological molecule may be any molecule of interest, such as a nucleic acid, a protein, or a carbohydrate. In some embodiments, the biological molecule is a glyoconjugate, e.g., hyaluronic acid, proteoglycans, glycoproteins; a protein; or a nucleic acid molecule, such as a DNA. The deposited biological molecule may be a component of a biological material that comprises multiple types of molecules. Thus, depositing a biological molecule, such as a protein, encompasses embodiments where different biological molecules are present in the deposited material.

The micropatterns of the invention may be used for many applications. For example immobilized proteins may be used to investigate protein-protein interactions, enzyme-substrate interactions, protein-DNA interactions, protein-oligosaccharide interactions, or protein-drug interactions. In some embodiments, interactions of the deposited biological material, e.g., a protein, with a cell may be evaluated using a micropattern generated as described herein.

In some embodiments, the micropatterns may be used in high throughput screening applications. For example, a micropattern comprising one or more antibodies may be used to evaluate samples for the presence of antigens that bind to the antibodies. A micropattern generated in accordance with the invention may also be used in screening systems for therapeutics, e.g., targeted at inhibiting tumor invasion. A practitioner could test for inhibitors of tumor cell migration along patterned extracellular matrix (e.g., linear collagen and blood vessel substrates)

In other embodiments, wound repair and neuronal tissue regeneration may be employed as linear substrates and the micropattern may be used for therapeutic agents that stimulate this process.

In further embodiments, micropatterns prepared in accordance with the invention may be used for rapid screening for distinctive patterns and combinations of matrix proteins that are selective for certain phenotypes of stem cells. That is, stem cell subsets may be selected that preferentially adhere to specific topographical patterns, with varying combinations of matrix molecules, e.g. patches of closely spaced laminin, collagen, and/or fibronectin. In another use relating to stem cells, micropatterns may also be used to test for optimal micro-environmental heterogeneity for stem cell differentiation, based on the concept that composite substrates of extracellular matrix, growth factor, and cytokine molecules in specific patterns will promote certain cell fates.

EXAMPLES

Example 1

Preparation of ECM Photomicropatterns

This example illustrates preparation of photomicropatterns. Schematics providing an example of the preparation procedure and micropatterns generated using the procedure are shown in FIGS. 1 through 6.

Coverslip Preparation

Glass coverslips, e.g., #1 thickness German glass coverslips (Carolina Biological Supply Company, Burlington, N.C.) or MatTek glass-bottom dishes (MatTek, Ashland Mass.) were washed in 50-68% $HNO_3$ (EM Science, Gibbstown, N.J.) for 30 minutes. Acid-washed coverslips or dishes were rinsed thoroughly for 4 hours to overnight in $H_2O$ under continuous flow. Glass surfaces were prepared for silanizatoin by incubation with 200 mM NaOH for 15 minutes, then rinsed with $H_2O$. The glass was then silanized with 1% 3-amino(propyl) trimethyloxysilane (ATPMS) (Sigma) diluted in $H_2O$ for 10 minutes followed by two rinses with $H_2O$ for 10 minutes. Glass surfaces were blown dry with compressed air. Silanized coverslips were cured at 65° C. for 2 hours. Coverslips were then activated by incubation with 0.5% glutaraldehyde in $H_2O$ for 30 minutes and rinsed 3 times over 30 minutes with $H_2O$. Glass surfaces were again blown dry with compressed air, and dishes with noticeable imperfections and/or debris were discarded. Activated coverslips were either used immediately or stored at 4° C. in a desiccated chamber. An example of this procedure is provided in FIG. 2.

PVA Monolayer Film Synthesis

A 5.6% (w/v) stock solution of PVA (MW ~98,000, 98% hydrolyzed, Sigma) in H2O was brought to ~90° C. in a water bath to solubilize the PVA. The solution was then immediately 0.2 micron filtered to remove contaminants. 1124 µl of 2N HCl (MG Scientific Inc., Pleasant Prairie, Wis.) was added to 8876 µl of the PVA solution, mixed, and aliquots were stored at 4° C. for up to 2 weeks. Activated glass surfaces were completely covered with this mixture and incubated for 4-5 minutes at room temperature. Spin-coating was then performed for 30 seconds at 7000 rpm with an acceleration of 550 rps using a spincoater (Laurel Technologies, Model # WS-400E-6NPP-Lite, North Wales, Pa.). This method generates hydrogels of ~100 nanometer thickness. PVA-coated dishes were allowed to cure at room temperature for 2 hours or overnight at 4° C. in a humidified container prior to use. Dishes with noticeable imperfections and/or debris were discarded. Dishes were ablated within 2 weeks of this process.

Photoablation (µPP)

A Zeiss LSM 510 NLO scanning confocal microscope equipped with a Coherent Ti:Sapphire Chameleon two-photon laser (1.5 W total power) was used for photoablation. The two-photon was tuned to 755 or 770 nm and used at ~90% power except where noted. Regions of interest (ROIs) were generated using the AIM software. Except where indicated, a Zeiss 63×N.A. 1.4 oil emersion objective was used during ablation. Scan speed was set to 4 and averaged 2-4 times per field of view to provide a laser dwell time of ~25.6 µsec/pixel. The digital zoom function was set to 1.6× to mimic a 100× objective to increase the time the laser was directed to each unit area. The more pixels scanned per unit area, the more efficient was the ablation. To decrease the ablation time, scanning was performed in both directions for an average of ~15 seconds per field of view. To decrease the size of a given pattern/array the digital zoom function was used to reduced the area scanned but the pixel array (512×512) was kept, effectively reducing the scan area per pixel.

In the absence of a fluorescent dye, the hydrogel surface was located using a KP 700/488 dichroic and 1% power on the HeNe 2 633 nm laser with a long pass 560 emission filter to generate a reflected light image. Prior to µPA, each dish/coverslip was leveled on the stage using the set screws in the Zeiss stage holder and allowed to equilibrate to room temperature for 10 minutes after focusing. The reflected light image was used for leveling until a uniform image was achieved. This leveling is vital for equal ablation at every point within the field of view. To ablate multiple fields of view, the tile function in the Multitime macro was utilized to generate a grid pattern surrounding each specified point.

Post µPP Protein Attachment

After two-photon ablation of the macromolecular thin film, 1M $NaHB_4$ in 1N NaOH was added to patterned dishes containing 200 mM ethanolamine in $NaHPO_3$ buffer (pH 8.0) at a 1:100 ratio for 8 minutes to quench glutaraldehyde autofluorescence. Following three rinses with PBS, fluorescently labeled proteins were diluted in PBS containing 0.1% Pluronic F-127 (Molecular Probes) and added to coverslips for 1 hour at 37° C. This adsorption was followed by two washes with PBS and rinsing with 2M NaCl to reduce non-specific electrostatic interactions with non-ablated regions of the thin film. Dishes were then blocked with 1.0% heat-denatured BSA for 1-hour at 37° C. Finally, dishes were rinsed twice with PBS and kept in PBS until use. Dishes could be used for up to 1 month.

Summary of Example 1

Photomicropatterns were prepared for use in investigating the role of ECM topography in cell migration. In this example, it was found that a thin (~0.1 μm) macromolecular PVA monolayer was sufficient to block cell attachment. Many other polymers including hydrogels derived from PVA, polyethylene glycol, and polyacrylamide are also susceptible to local photolytic ablation (Yamato, M. et al., *J. Biomed. Mater. Res. A.*, 67:1065-71 (2003)). A two-photon confocal microscope was used to ablate precise patterns in the PVA film. Through the computer-controlled 'region of interest' (ROI) function, as many as several hundred ablation spots per field of view could be generated and stored as templates. These templates could then be applied multiple times automatically through Zeiss AIM software to adjacent areas to generate a large array of a single pattern or any combination of patterns. To create smaller, more closely spaced patterns, we simply changed to a higher-magnification objective or used a digital zoom through the software.

Example 2

Use of ECM Photomicropatterns to Investigate ECM Topographies in Fibroblast Migration Utilizing the flexibility of μPP, we generated multiple patterns to test roles of different ECM topographies in fibroblast migration.

Adsorption of ECM Protein

Figure 3:
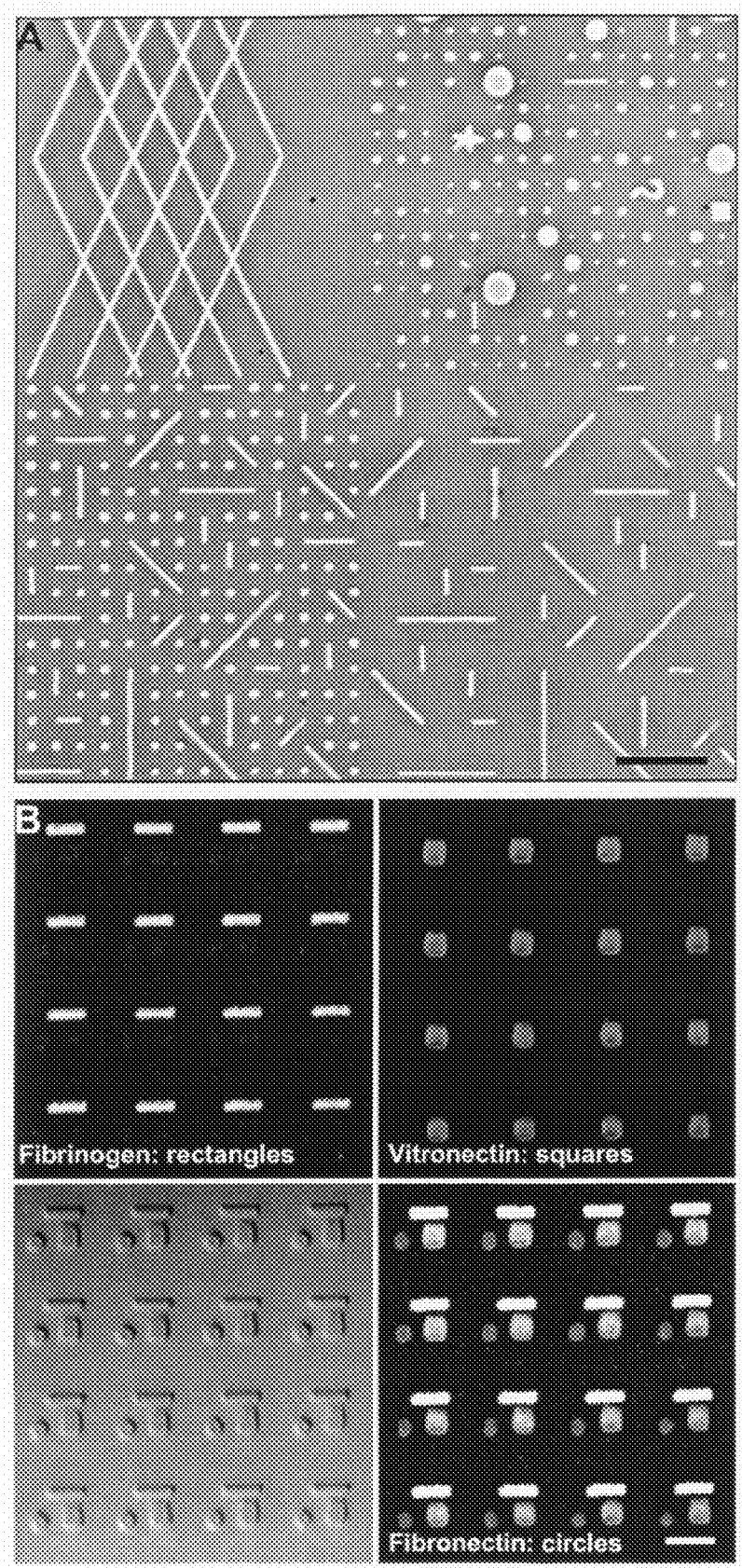
FIG. 3. A) Phase contrast image of four different ROI templates used in close proximity to show the flexibility of μPP. B) Serial ablation to generate patterns of multiple ECM molecules: Thin PVA films were ablated, labeled with fibrinogen (rectangles) and blocked with 1% BSA, then second and third ablations were performed within microns of the original pattern and labeled with vitronectin (squares) and fibronectin (circles), respectively. DIC image is in the lower left corner. Scale bars in panels A and B are 20 and 5 μm, respectively.
Figure 4:
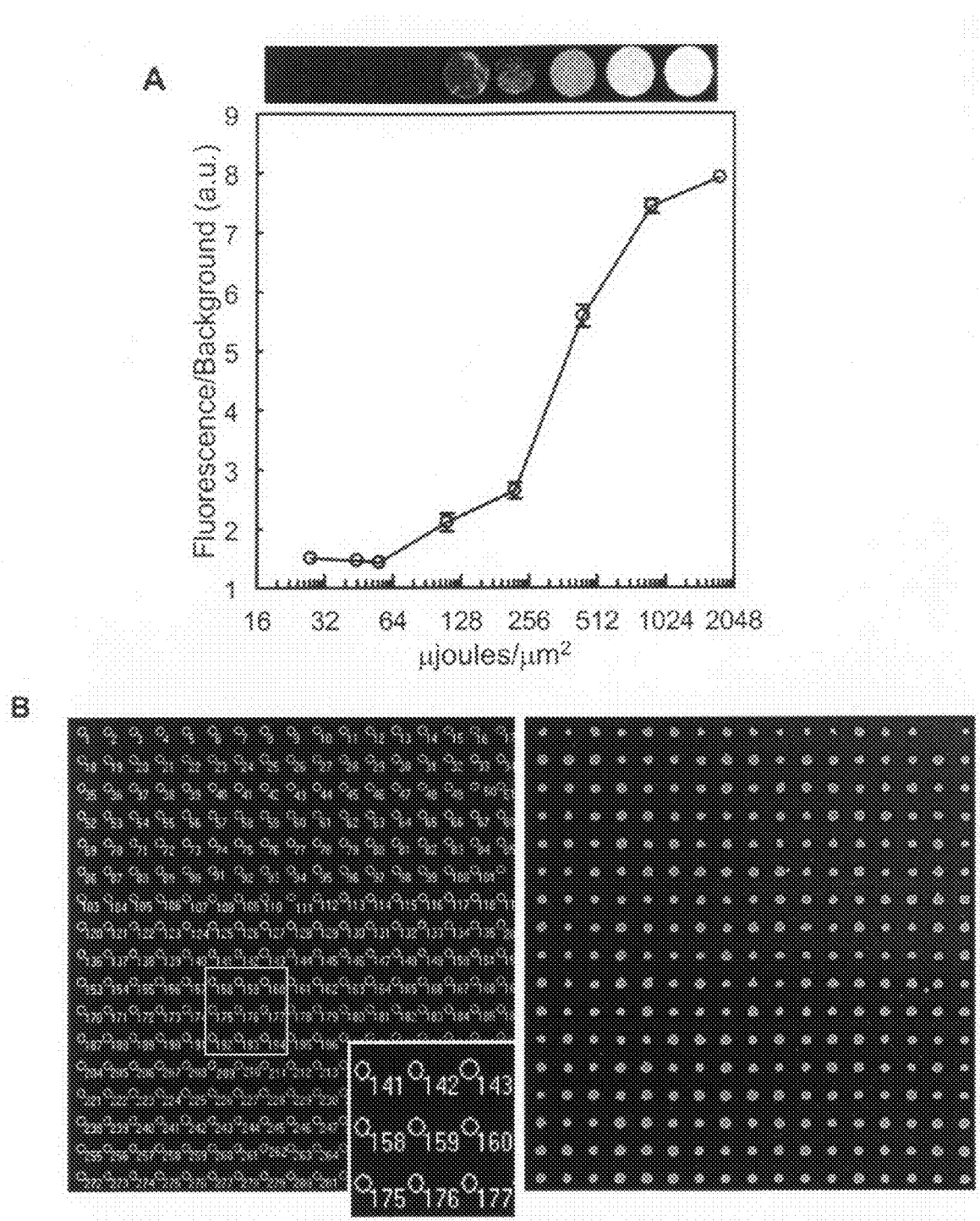
FIG. 4. A) Efficiency of ECM protein adsorption to ablation sites is dependent on total light energy. Laser power was varied through the AOM and measured at the back focal plane of the objective to estimate joules per unit area. Total energy per unit area (μjoules/μm$^2$) was calculated from the measured wattage and the total dead time the laser was focused on a given pixel area, which depended on scan speed and number of times scanned (line averaging function). Top panel shows representative fluorescence micrographs of AF568-labeled fibronectin used for the graph below. B) A representative region of interest (ROI) template (left) used to generate a dot-based pattern. (Right panel) AF647 fibronectin conjugated to the ablation sites generated using the ROI template shown in left panel. Scale bar in B is 10 μm.
Figure 5:
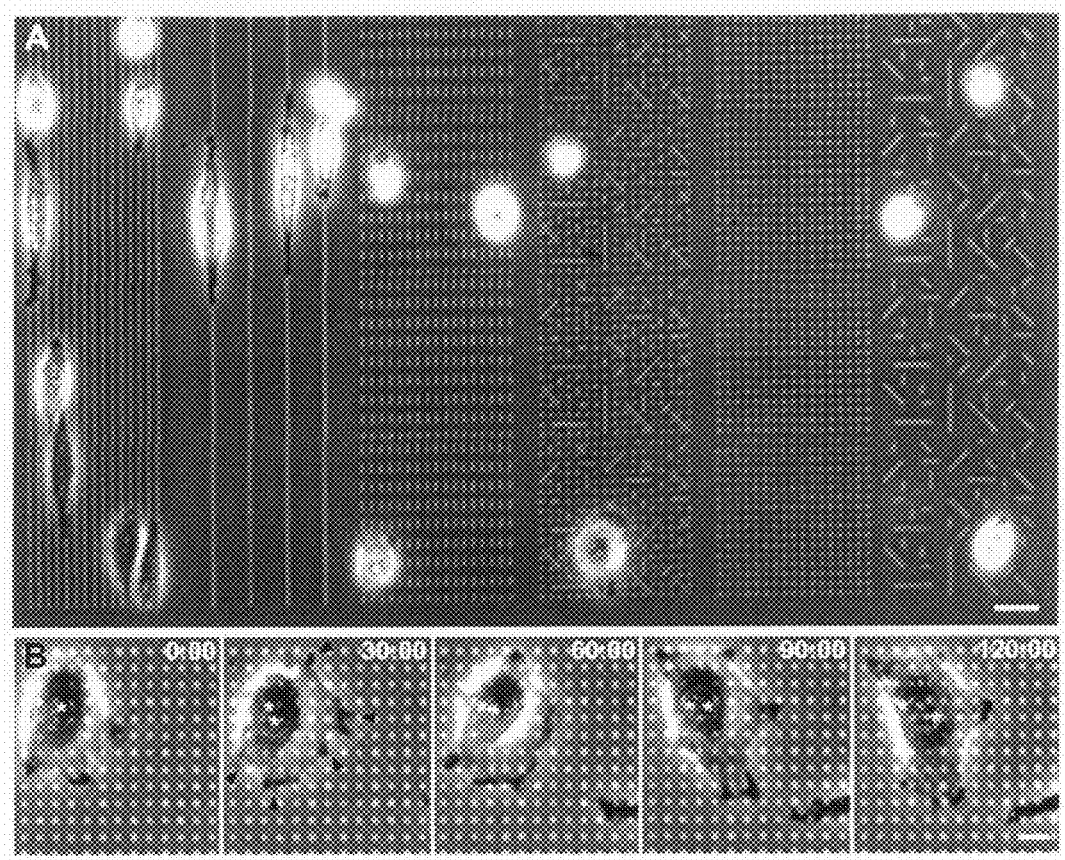
FIG. 5. A) A large patterned array showing multiple patterns used to determine how ECM topography dictates fibroblast migration. B) Timelapse images of a fibroblast moving slowly over a dot-based ECM pattern. Note the multiple sites of protrusive activity (black arrowheads) and the spread cell morphology. Asterisks denote original and current nuclear position. Average cell velocity was 8.26 μm/hr. Scale bar in A is 20 μm and in B is 10 μm.
Figure 6:
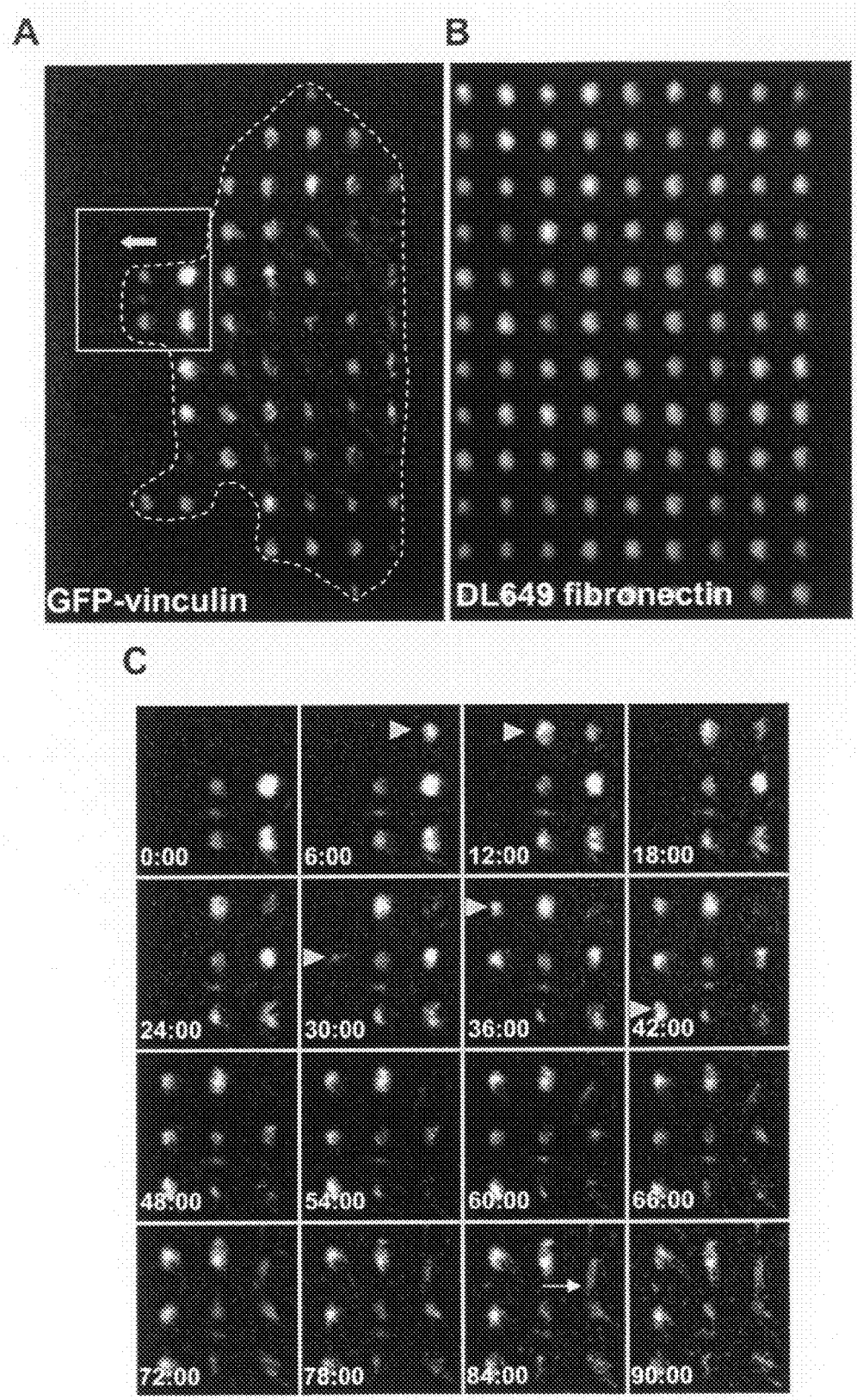
FIG. 6. A-B) Total internal reflection microscopy (TIRM) using μPP patterns. A) NIH3T3 fibroblasts were transfected with GFP-vinculin to visualize focal adhesions and replated onto a dot patterned fibronectin ECM (~5 μm apart). B). The insert (white box from A) in panel C shows adhesions forming at the periphery of the cell (white arrowheads). Note that at later time points, GFP-vinculin is observed outside of the dot pattern in elongated adhesions (arrow).

After local PVA ablation, ECM proteins were adsorbed to the etched surfaces; adsorption was dependent on the extent of ablation from the total amount of light energy focused on a given region. This method permits rapid design and testing of multiple patterns, such as lines, curves, dots, and any shape or size, coated with any ligand without needing the physical masks or stamps associated with photolithography or microcontact printing (Mrksich, M. et al., *Proc. Natl. Acad. Sci. USA*, 93:10775-8 (1996)). The high refractive index (>1.5) of PVA allows for live-cell fluorescence techniques such as total internal reflection microscopy (TIRM), even through non-ablated regions of the film, to observe dynamic changes in GFP-linked cytoskeletal components. The ablated regions of the PVA thin film are also visible by phase and DIC microscopy. Because μPP does not require a physical stamp, multiple different protein patterns can be generated in close proximity. FIG. 3 shows the result of three rounds of serial ablation, ECM protein attachment, washing, and blocking to deposit fibrinogen, vitronectin, and finally fibronectin within 2 μm of each other.

1D Topography Mimics 3D Fibrillar Migration

When attached to dot arrays (~5 μm spacing, 3.4 μm² area per ECM island), fibroblasts showed multiple points of protrusive activity (multi-axial) with slow migration. In striking contrast, fibroblasts attaching to single 1.5-μm wide fibrillar lines (termed here "1D") demonstrated rapid spreading, polarization, motility and uni-axial phenotype similar to previous observations of fibroblasts in cell-derived 3D matrices. These effects were independent of the ligand, since the same phenotype was observed if fibrillar lines were coated with vitronectin or collagen IV. To mimic the high ligand density of 3D fibrillar matrix, we increased the fibronectin concentrations for coating 1D lines and uniform surfaces up to the near-saturating level of 1000 μg/ml. On 2D surfaces, increased ligand density resulted in the expected reduction in cell speed, whereas migration on fibrillar patterns remained elevated in contradiction to the well-established effect of increased ligand density on 2D cell migration.

To test whether epithelial cells also display rapid 1D migration, we compared human epidermal keratinocyte (HK) migration. Although unable to invade into 3D cell-derived matrices, HKs often followed the linearity of the matrix; migration velocity on top of matrices increased ~1.6-fold in 3D versus 2D, similar to fibroblasts. On 1D fibrillar lines, HKs acquired a phenotype similar to fibroblasts with a remarkable 3-fold faster migration than in 2D. These data suggest that cell migration on fibrillar ECM structures is mimicked by 1D lines.

Coordinated Protrusion-Retraction Cycles are a Vital Component of Rapid Migration We further compared 1D fibrillar, 2D, and 3D cell migration by quantifying the coordination between three key steps of fibroblast migration: protrusion, cell body translocation, and tail retraction. As expected, fibroblasts migrating on 2D uniform surfaces demonstrated the hindrance of leading edge protrusion by inefficient tail retraction described previously (Chen, W., *J. Cell Biol.*, 90:187-200 (1981); Chen, W. T., *J. Cell Biol.*, 81:684-691 (1079)).

In contrast, both 3D and 1D fibrillar migration at 10 and 50 μg/ml fibronectin displayed highly efficient coordination between all three processes according to correlation analyses, with little reduction in leading edge protrusion due to inefficient tail retraction. Interestingly, the degree of coordination between leading edge protrusion and tail retraction on 1D fibrillar lines did decrease at high ligand densities (1000 μg/ml FN) due to protrusive activity at the rear resulting in tail elongation, yet this effect did not prevent either leading edge protrusion or cell body translocation.

Adhesions Resembling "3D-Matrix Adhesions" are Associated with 1D Fibrillar Migration Spatiotemporal feedback occurs between the actomyosin cytoskeleton and focal adhesion components to regulate adhesion strength, which can in turn regulate cell migration (Gupton, S. L. and Waterman-Storer, C. M., *Cell*, 125:1361-74 (2006)). Thus, unique cytoskeletal and adhesion organization in 1D or 3D systems might be important for rapid migration. A primary component of fibrillar and 3D-matrix adhesions, α5 integrin, was present in a single long adhesion spanning the entire length of fibroblasts, as was activated $\beta_1$ integrin. The focal adhesion proteins FAK, vinculin, and paxillin localized in long linear adhesions along the entire cell axis, resembling "3D-matrix adhesions" (Cukierman, E. et al., *Science*, 294:1708-12 (2001)). In addition, phospho-FAK397 staining was concentrated at leading and trailing edges, presumably at sites of high tension.

Because adhesion assembly and disassembly mechanisms influence cell migration, we performed live-cell time-lapse TIRM imaging of GFP vinculin on 1D fibrillar patterns. Kinematic data revealed that adhesions formed within 1 μm of the leading edge and their assembly rate matched the rate of leading edge protrusion. In addition, once vinculin was incorporated into the adhesion at the front, adhesion disassembly was observed only at the trailing edge with rates similar to adhesion assembly. Consequently, adhesions beneath the cell may serve as a stable anchor, while the main sites of adhesion regulation are at the leading and trailing edges.

Uni-Axial Phenotype in 1D Migration is Associated with Rapid Migration

A potential explanation for the persistent high velocities we observed with 1D fibrillar migration could be physical limitation of lateral cell spreading and lateral lamellae. This proposal is supported by analysis of cell adhesion area (AA) as measured by vinculin staining and total spread area (TSA), both of which were significantly reduced in 1D compared to 2D conditions (AA: 54.6±22.1 vs. 89.9±37.4, TSA: 370.5±183 vs 1414±630, P<0.05). To test this hypothesis further, we generated fiber-like patterns with widths of 1 to 40 μm. With increasing fibril width, cells generally continued to migrate in one direction but demonstrated increased cell spreading, loss of uni-axial morphology above 5 μm fibril widths, and decreased migration rate. These data indicate that loss of the uni-axial phenotype in conjunction with increased lateral cell spreading on wider fibrils is detrimental to rapid cell migration.

Interestingly, cells on fibrillar lines below 1.5 μm wide showed a reduced migration rate compared to 2.5 μm widths. We hypothesized that this reduced migration could be due to insufficient ECM area available for forming new adhesions. As a test, we generated multiple 1 μm-wide lines spaced ~5 μm apart and found that migration rates increased to the levels on 2.5 μm fibrils. Moreover, vinculin-containing adhesions were localized to either side of the 2.5 μm fibrils, suggesting that fibroblasts treat this width as two smaller parallel fibers analogous to railroad tracks.

The importance of topography to migration was particularly apparent when cells migrating on fibrillar patterns (single or multiple lines) confronted either a perpendicular fibrillar pattern or a 2D region. In both cases, the uni-axial lamella transformed into several multi-axial lamellae, leading to a spread cell morphology and slowing of migration. The opposite transformation also occurred from 2D to 1D mode of migration, though less frequently, accompanied by an increase in velocity. Therefore, 1D fibrillar patterns reduce lateral spreading of the lamella, thereby increasing the efficiency by which cells migrate along a single axis.

Microtubule Requirement for Rapid Migration

Immunostaining of actin and microtubule (MT) cytoskeletal networks in 1D revealed linear organization. On fibrillar patterns, stress fibers stretched from leading to trailing edge parallel to the matrix, while MTs—implicated in establishing cell polarity—became localized in parallel arrays extending into the lamellipodium. Staining for detyrosinated (Glu)-tubulin, a post-translational modification of tubulin associated with MT stabilization, revealed large quantities of stabilized MTs throughout 1D and 3D migrating cells and accumulated in an anterior bundle as shown by an elevated glu/tyr-tubulin ratio in both compared to 2D conditions. This distribution resembles the stabilized MTs of neurons required for axon maintenance (Shea, T. B., *Brain Res. Bull.*, 48:255-61 (1999)), suggesting that it may help maintain uni-axial polarity and migration along a matrix fibril. Surprisingly, the centrosome as marked by pericentrin was oriented toward the rear of fibroblasts migrating in 3D and 1D, as recently discovered for epithelial cells and in zebrafish (Pouthas, F. P. et al., *J. Cell Sci* (2008)). This inconsistency with frontal centrosome orientation in 2D wound healing assays (Etienne-Manneville, S, and Hall, A., *Cell*, 106:489-98 (2001); Gundersen, G. G. and Bulinski, J. C., *Proc. Natl. Acad. Sci. USA*, 85:5946-50 (1988)) suggests distinct mechanisms of polarity in single cell migration on 1D and 3D ECM fibrils compared to 2D.

Actomyosin-Microtubule Crosstalk is Altered by ECM Dimensionality

We tested whether the crosstalk between MTs and the myosin II contractile apparatus reported for cells in 2D (Even-Ram, S. et al., *Nat. Cell Biol.*, 9:299-309 (2007)) occurred in 1D and 3D. Inhibition of myosin II ATPase activity with blebbistatin produced the opposite effect on fibroblast motility in 2D versus both 3D and 1D conditions. While blocking myosin-II-dependent contractility in 2D led to a small increase in migration rate (+13%), fibroblasts migrating in 3D matrices or along 1D fibrils showed 61% and 55% reductions, respectively. Moreover, unlike 2D, 3D and 1D conditions showed no significant increases in cell protrusion; fibroblasts still followed the fibronectin fibrils/patterns, suggesting that contractility is not involved in establishing cell polarity on fibrillar structures.

The MT inhibitor nocodazole caused a loss of cell polarity and detachment from the 1D matrix. To reduce this hypercontractile response, we pretreated cells with a low dose of blebbistatin (5 μM) prior to nocodazole addition. This led to uncontrolled protrusion in all directions and reduced migration in 1D and 3D conditions, in contrast to increased migration in 2D. Inhibitor treatments showed that the uni-axial phenotype is maintained after loss of contractility (blebbistatin treatment), while cells lose the ability to orient along ECM fibrils in the absence of MTs (nocodazole treatment). These results highlight the importance of MTs in 1D and 3D rapid oriented migration compared to their previously characterized role in maintaining directionality of 2D migration.

Rac Levels can Mediate Uni-Axial Phenotype but not Accelerated Migration

We previously reported that activity of the small GTPase Rac is lower in 3D than 2D and alters directional cell migration independently of velocity (Pankov, R. et al., *J. Cell Biol.*, 170:793-802 (2005)). We tested the roles of Rac in morphology and ECM migration in RNAi knockdown experiments. Knockdown of Rac using siRNA to ~25% of control levels caused no significant change in cell velocity. In 2D, however, Rac knockdown reduced cell spreading and mimicked the uni-axial phenotype closely in terms of cell shape, yet migration rates did not increase. Immunostaining for vinculin revealed that adhesions on the 2D ECM remain spatially separated. Taken together, these data indicate that the uni-axial phenotype alone is not sufficient to promote rapid migration and that ECM topography can affect the spatial distribution of cell adhesions.

Summary

The data in this example indicate that ECM topography can regulate cell migration rate and cellular phenotype regardless of ligand density. We demonstrated that a single, nearly 1 dimensional micropatterned line can mimic many aspects of the phenotype induced by cell-derived oriented 3D matrices, including rapid uni-axial migration that is independent of ligand density. Additional contrasts to 2D migration include a dependence on myosin II contractility for rapid migration with a requirement for an anterior microtubule bundle for both 1D and 3D forms of ECM-directed migration. This example thus illustrates that photomicropatterning provides a valuable tool for such investigations.

While specific examples have been provided, the above description is illustrative and not restrictive. Many variations of the invention will become apparent to those skilled in the art upon review of this specification. The scope of the invention should, therefore, be determined not with reference to the above description, but instead should be determined with reference to the appended claims along with their full scope of equivalents.

All publications and patent documents cited herein are incorporated by reference in their entirety for all purposes to the same extent as if each individual publication or patent document were individually denoted to be incorporated. Citation of various references in this document is not an admission that any particular reference is considered to be "prior art" to the invention.

What is claimed is:

1. A method of creating a micropattern of a biological molecule, the method comprising
preparing a hydrophilic macromolecular film attached to an activated substrate, wherein the substrate is of a material to which the biological molecule can adhere;
ablating the macromolecular film using a laser to create a pattern; and depositing the biological molecule onto the pattern, wherein the biological molecule adheres to the substrate and not to the hydrophilic macromolecular film.

2. The method of claim 1, wherein the hydrophilic macromolecular film is a hydrogel.

3. The method of claim 2, wherein the hydrogel is polyvinyl alcohol or polyacrylamide.

4. The method of claim 1, wherein the hydrophilic macromolecular film is a silicone polymer or co-polymer.

5. The method of claim 1, wherein film is a thin film.

6. The method of claim 1, wherein the substrate is glass.

7. The method of claim 6, wherein the substrate is activated using a silane.

8. The method of claim 1, wherein the laser is a pulsed laser controlled by a shutter and a light guiding system.

9. The method of claim 1, wherein the biological molecule is a glycoconjugate, a protein or a nucleic acid.

10. The method of claim 9, wherein the biological molecule is a glycoconjugate.

* * * * *